Figure 1:
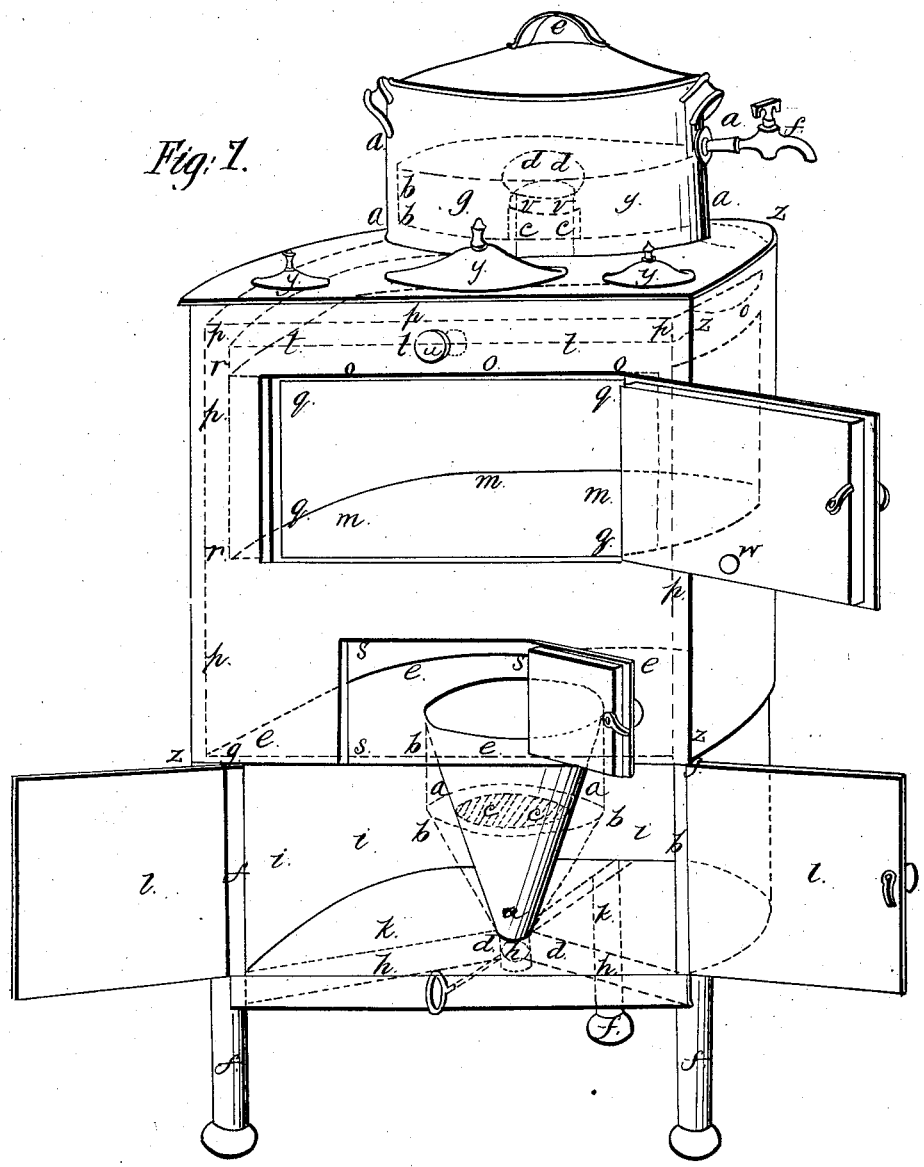
Figure 2:
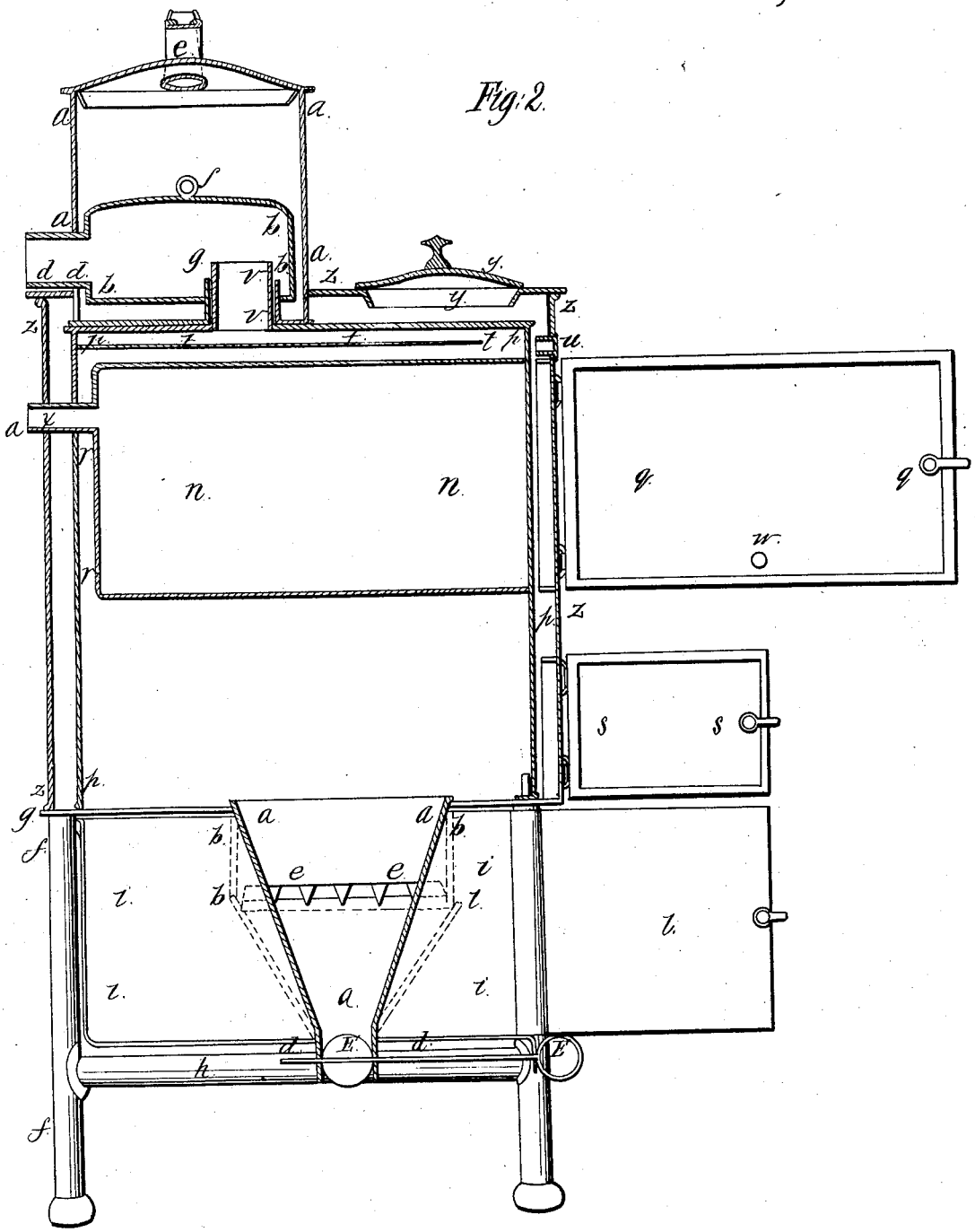

5703X

Sheet 1-2 Sheets.

J. Hurd, Jr.

Cook Stove.

No.

Patented Nov. 10, 1829.

5703X

Sheet 2-2 Sheets.

J. Hurd, Jr.

Cook Stove.

No.

Patented Nov. 10, 1829.

United States Patent Office

PTO - BOYERS, PA Duty Station

MISSING PAGE TEMPORARY NOTICE

PATENT # 5703 X FOR ISSUE DATE 11-10-1829
HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All text

Data Conversion Operation

Boyers, Pa